US008654110B2

(12) United States Patent
Imai et al.

(10) Patent No.: US 8,654,110 B2
(45) Date of Patent: Feb. 18, 2014

(54) DISPLAY DEVICE AND METHOD FOR DRIVING DISPLAY DEVICE

(75) Inventors: Hajime Imai, Osaka (JP); Hideki Kitagawa, Osaka (JP); Shinya Tanaka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 540 days.

(21) Appl. No.: 12/737,185

(22) PCT Filed: Apr. 30, 2009

(86) PCT No.: PCT/JP2009/058517
§ 371 (c)(1),
(2), (4) Date: Dec. 16, 2010

(87) PCT Pub. No.: WO2010/004803
PCT Pub. Date: Jan. 14, 2010

(65) Prior Publication Data
US 2011/0090193 A1 Apr. 21, 2011

(30) Foreign Application Priority Data

Jul. 11, 2008 (JP) ................................. 2008-181761

(51) Int. Cl.
*G06F 3/038* (2013.01)
*G09G 5/00* (2006.01)
*G09G 3/36* (2006.01)

(52) U.S. Cl.
USPC ........................................... 345/207; 345/104

(58) Field of Classification Search
USPC .................... 345/87–104, 207; 257/290–294; 348/296–298
See application file for complete search history.

(56) References Cited

U.S. PATENT DOCUMENTS

| 6,947,102 | B2 * | 9/2005 | den Boer et al. ................. 349/12 |
| 8,139,055 | B2 * | 3/2012 | Brown .......................... 345/207 |
| 2001/0040828 | A1 | 11/2001 | Berggren et al. |
| 2005/0176194 | A1 | 8/2005 | Sasaki et al. |
| 2005/0212916 | A1 * | 9/2005 | Nakamura et al. ........ 348/207.99 |
| 2005/0258337 | A1 * | 11/2005 | Ozawa ........................ 250/208.1 |
| 2005/0280713 | A1 * | 12/2005 | Hagihara et al. .......... 348/207.99 |
| 2006/0044300 | A1 * | 3/2006 | Koyama et al. ................ 345/207 |
| 2007/0126697 | A1 | 6/2007 | Sato et al. |
| 2007/0242030 | A1 | 10/2007 | Kim |

(Continued)

FOREIGN PATENT DOCUMENTS

EP 1 662 467 5/2006
JP 8-234906 A 9/1996

(Continued)

OTHER PUBLICATIONS

International Search Report dated Aug. 11, 2009.

*Primary Examiner* — Bipin Shalwala
*Assistant Examiner* — Steven Holton
(74) *Attorney, Agent, or Firm* — Harness, Dickey & Pierce

(57) ABSTRACT

A matrix type display device including: a photosensor, provided in a display region, for outputting a signal corresponding to an intensity of light emitted to the photosensor; a TFT of n-channel type, the TFT serving as a source follower including a gate to which the signal is inputted; and light intensity detecting means for detecting the intensity of the light by detecting an output of the source follower, which is the TFT. In at least one embodiment, the TFT includes a drain to which a first pulse signal (Vpulse2) having a first pulse is inputted, the first pulse rising from a low level to a high level in a state where the signal is inputted to the gate of the TFT.

13 Claims, 8 Drawing Sheets

(56) References Cited

U.S. PATENT DOCUMENTS

| | | | |
|---|---|---|---|
| 2008/0079860 A1 | 4/2008 | Kunimori et al. | |
| 2010/0315394 A1 | 12/2010 | Katoh et al. | |

FOREIGN PATENT DOCUMENTS

| | | |
|---|---|---|
| JP | 11-026740 A | 1/1999 |
| JP | 2005-217708 A | 8/2005 |
| JP | 2007-179000 A | 7/2007 |
| JP | 2007-286029 A | 11/2007 |
| JP | 2007-304519 A | 11/2007 |
| KR | 10-2008-0028780 | 4/2008 |
| RU | 2 248 626 | 3/2005 |
| WO | WO-2007/145347 A1 | 12/2007 |
| WO | WO 2008/047677 | 4/2008 |

\* cited by examiner

DISPLAY DEVICE AND METHOD FOR DRIVING DISPLAY DEVICE

TECHNICAL FIELD

The present invention relates to a display device including a display region provided with a photosensor.

BACKGROUND ART

There is a liquid crystal display device including a pixel circuit provided with a photosensor. Efforts are now made to apply such the liquid crystal display device to fingerprint authentication, touch panels, etc.

FIG. 6 shows (i) a configuration of a display region included in such the display device described in Patent Literature 1 and (ii) a block diagram of a circuit for driving the display region.

In the display region, a pixel 18, which constitutes an array, includes a sensor circuit 10, in addition to a display circuit including a liquid crystal capacitor CLC, an auxiliary capacitor C2, a TFT M4, etc. The sensor circuit 10 includes an amplifier TFT M1 of n-channel type, a photosensor D1, and a capacitor C1.

In the display circuit, a gate of the TFT M4 is connected with a gate line GL, and a source of the TFT M4 is connected with a data line 6'. The liquid crystal capacitor CLC is formed between (i) a pixel electrode connected with a drain of the TFT M4 and (ii) a common electrode to which a common voltage VCOM is applied. The auxiliary capacitor C2 is formed between the pixel electrode and a common wire TFT-COM.

The gate line GL and the common wire TFTCOM are driven by a gate driver 15, whereas the data line 6' is driven by a source driver 14.

In the sensor circuit 10, a cathode of the photosensor D1 and one end of the capacitor C1 are connected with each other, and a gate of the amplifier TFT M1 is connected with a point at which the photosensor D1 and the capacitor C1 are connected with each other. A drain of the amplifier TFT M1 is connected with the data line 6', and a source of the amplifier TFT M1 is connected with a sensor output wire 6. The data line 6' is driven by a sensor read-out driver 17 via a switch (not illustrated) during a sensor driving period, which is not included in a data signal writing period. A voltage of the sensor output wire 6 is read by the sensor read-out driver 17.

An anode of the photosensor D1 is connected with a reset wire RST, and the other end of the capacitor C1 is connected with a row selection wire RS. The reset wire RST and the row selection wire RS are driven by a sensor row driver 16.

FIG. 7 shows a concrete configuration of the sensor circuit 10 in detail. The drain of the amplifier TFT M1 is connected with the data line 6'. Further, the drain of the amplifier TFT M1 is supplied with a voltage Vdd from the sensor read-out driver 17 during the sensor driving period. The source of the amplifier TFT M1 outputs a sensor output voltage Vout to the sensor output wire 6. Between the gate and the drain of the amplifier TFT M1, a capacitor Cagd is formed. Between the gate and the source of the amplifier TFT M1, a capacitor Cags is formed.

The photosensor D1 is constituted by a diode-connected TFT 101. The photosensor D1 includes (i) an anode A, which is constituted by connection of a gate and a drain of the TFT 101, and (ii) a cathode K, which is constituted by a source of the TFT 101. The anode A is supplied with a voltage Vrst from the reset wire RST. Between the anode A and the cathode K, i.e., between the gate and the source of the TFT 101, a capacitor Cdgs is formed.

The capacitor C1 has a capacitor value Cst. The other end of the capacitor C1 is supplied with a voltage Vpulse1 from the row selection wire RS.

The gate of the amplifier TFT M1, the cathode of the photosensor D1, and the one end of the capacitor C1 are connected with each other at a point, which is referred to as a node NetA.

Next, with reference to FIG. 8, the following will describe how the sensor circuit 10 having the above configuration operates.

During the sensor driving period, the data line 6' is disconnected from the source driver 14, and is connected with the sensor read-out driver 17. At a time t1, which is the beginning of the sensor driving period, the voltage Vrst, which is applied to the reset wire RST by the sensor row driver 16, is set to a high level (here, 0V). This allows the photosensor D1 to become conductive in a forward direction, so that an electric potential VnetA at the node NetA is set to a high level (here, 0V). Further, at the time t1, the voltage Vpulse1, which is applied to the row selection wire RS by the sensor row driver 16, is set to a low level (here, 0V). The voltage Vdd, which is applied to the data line 6' by the sensor read-out driver 17, is set to 15V which is a direct-current voltage.

Subsequently, at a time t2, the sensor row driver 16 sets the voltage Vrst to a low level (here, −10V). At the time t2, the photosensor D1 is put into an inverse-bias state, since an electric potential at the anode A becomes lower than that at the cathode K.

From the time t2, a charging period T1 begins. In the charging period T1, the node NetA is charged according to an intensity of light emitted to the photosensor D1. When light is emitted to the photosensor D1, an amount of a leakage current flowing from the cathode K to the anode A changes according to the intensity of the emitted light. In a light part, the amount of leakage current is large; therefore, an electric potential at the anode A, i.e., the electric potential VnetA is reduced rapidly. On the other hand, in a dark part, the amount of leakage current is small; therefore, the electric potential VnetA is reduced slowly.

At a time t3, at which the charging period T1 ends, the sensor row driver 16 sets the voltage Vpulse1 to a high level (here, 20V). In response to this, the electric potential VnetA is boosted from a negative electric potential to a positive electric potential, due to capacitive coupling by the capacitor C1, and an electric potential difference between the light part and the dark part is maintained. At the time t3, the amplifier TFT M1 becomes conductive; however, the electric potential VnetA, i.e., the electric potential at the gate of the amplifier TFT M1 is boosted, due to a bootstrap effect through capacitive coupling between the capacitor Cagd and the capacitor Cags. Consequently, the amplifier TFT M1 outputs, from the source, an output voltage Vout which is higher than that obtained in a case where no bootstrap effect is given. From the time t3, an output period T2, which is for sensor output, begins.

Here, assume that a total capacitor value Ctotal is expressed by:

$$Ctotal = Cdgs + Cst + Cagd + Cags$$

(each capacitor value in the right-hand side is indicated by a name of the corresponding capacitor), and $$\alpha = Cst/Ctotal.$$

Then, a boost value ΔVnetA, which is a value by which the electric potential VnetA is boosted by the voltage Vpulse1, is expressed by:

$$\Delta VnetA = \alpha \times Vpulse1_{p\text{-}p}.$$

Note that "Vpulse1$_{p\text{-}p}$" represents a peak-to-peak voltage of Vpulse1. In the above example, Vpulse1$_{p\text{-}p}$ is 20V.

The output voltage Vout has a value corresponding to the electric potential VnetA. Therefore, by reading the output voltage Vout by the sensor read-out driver 17 in the output period T2, it is possible to detect the sensor output of the photosensor D1, i.e., the intensity of the light emitted to the photosensor D1.

At a time t4, at which the output period T2 ends, the sensor row driver 16 sets the voltage Vpulse1 to a low level (here, 0V). Thus, the sensor driving period ends.

Citation List

[Patent Literature]

[Patent Literature 1]

International Publication, No. WO 2007/145347 (Publication Date: Dec. 21, 2007)

[Patent Literature 2]

Japanese Patent Application Publication, Tokukai, No. 2005-217708 A (Publication Date: Aug. 11, 2005)

[Patent Literature 3]

Japanese Patent Application Publication, Tokukaihei, No. 11-26740 A (Publication Date: Jan. 29, 1999)

SUMMARY OF INVENTION

Technical Problem

However, according to the conventional sensor circuit 10, in a case where a sensor output of a photosensor D2 is detected during the output period T2, the output voltage Vout is the one obtained as a result of charging a load(s) (e.g., a hold capacitor in the sensor output wire 6 or a hold capacitor in an input part of an analog-digital converting circuit) provided in the downstream of the source of the amplifier TFT M1. Therefore, actually, as shown in FIG. 9, the output voltage Vout increases with a certain time constant. Consequently, a difference level between (i) a final value of the output voltage Vout in the light part and (ii) a final value of the output voltage Vout in the dark part, both of which final values are obtained in the output period T2, is detected as a light-dark difference. However, since the amplifier TFT M1 serves as a source follower, a maximum final value of the output voltage Vout in the output period T2 is "Vout=VnetA−Vth≤Vdd" ("Vth" represents a threshold voltage of the amplifier TFT M1). Thus, a difference between (i) the final value of the output voltage Vout which can be obtained in the light part and (ii) the final value of the output voltage Vout which can be obtained in the dark part is limited. Conventionally, the difference between the final values is so small that it is impossible to reliably distinguish between light and dark.

Furthermore, in a case of a display device having a higher resolution, a quite short sensor driving period is allocated to (i) each sensor circuit 10 or (ii) sensor circuits 10 in each row. Accordingly, it is indispensable to set the output period T2 so as (i) to end before the amplifier TFT M1, which serves as a source follower, is switched from a conductive state to a non-conductive state and (ii) to be very short so as to satisfy the relationship "Vout<VnetA−Vth". This makes it more difficult to distinguish between light and dark.

Here, assume a case where a display panel is made of amorphous silicon. A TFT made of amorphous silicon has a high threshold voltage Vth and a low mobility. Accordingly, in this case, the amplifier TFT M1 has a lower ability as an amplifier than that of a TFT made of polysilicon. Therefore, in order to overcome the difficulty in distinguishing between light and dark, it is necessary to increase the electric potential VnetA when the amplifier TFT M1 performs output, for the purpose of securing a large output current, i.e., securing a wide dynamic range of the sensor output. Further, also in the case of the TFT made of polysilicon, in order to obtain a wider dynamic range, it is necessary to increase the electric potential VnetA, as with the above case.

In order to increase the electric potential VnetA, the following methods are considered: 1) increasing the peak-to-peak voltage Vpulse1$_{p\text{-}p}$ of the voltage Vpulse1; 2) increasing the capacitor value Cst of the capacitor C1; 3) increasing the voltage Vdd; and 4) increasing a channel width W of the amplifier TFT M1. However, with the method 1), it is necessary enhance the durability of an IC (e.g., the sensor row driver 16) which supplies the voltage Vpulse1; therefore, the method 1) has a disadvantage of increasing cost. With the method 2), an area occupied by the capacitor C1 is increased; therefore, the method 2) has a disadvantage of reducing an aperture ratio of a pixel. With the method 3), it is necessary to increase the durability of an IC (e.g., the sensor read-out driver 17) which supplies the voltage Vdd; therefore, the method 3) has a disadvantage of increasing cost and a consumption current. With the method 4), an area occupied by the amplifier TFT M1 is increased; therefore, the method 4) has a disadvantage of reducing an aperture ratio of a pixel.

Thus, in enlarging the dynamic range of the sensor output, the conventional display device including the pixel provided with the photosensor involves the problems of (i) increasing the power source voltage for the photosensor and (ii) reducing the aperture ratio of the pixel.

The present invention was made in view of the foregoing problems, and an object of the present invention is to provide: (i) a display device including a display region provided with a photosensor, which display device is capable of enlarging a dynamic range of a sensor output, without (a) increasing a power source voltage for the photosensor or (b) reducing an aperture ratio of a pixel; and (ii) a method for driving the display device.

Solution to Problem

In order to solve the foregoing problems, a display device of the present invention is a display device of matrix type, including: photosensors, provided in a display region, each for outputting a signal corresponding to an intensity of light emitted to the photosensor; thin-film transistors of n-channel type, the thin-film transistors each serving as a source follower including a gate to which the signal is inputted; and light intensity detecting means for detecting the intensity of the light by detecting an output of the source follower, which is the thin-film transistor, each thin-film transistor including a drain to which a first pulse signal having a first pulse is inputted, the first pulse rising from a low level to a high level in a state where the signal is inputted to the gate of the thin-film transistor.

According to the above invention, if the first pulse of the first pulse signal is applied to the drain of the TFT in the state where the signal outputted by the photosensor is inputted to the gate of the TFT, an electric potential at the gate increases due to capacitive coupling between the gate and the drain of the TFT. In addition, the electric potential at the gate further increases due to capacitive coupling between the gate and the source of the TFT, which has become conductive. Accordingly, the electric potential at the gate of the TFT increases more largely as compared with the conventional configuration. Therefore, the output of the source follower, which output has an electric potential corresponding to the electric potential at the gate, also has an electric potential higher than that obtained in the conventional configuration.

Thus, the output of the source follower is increased, i.e., the dynamic range of the output of the photosensor is enlarged. With this, it is possible to detect, by the light intensity detecting means, a greater light-dark difference with respect to the light emitted to the photosensor, as compared with that of the conventional configuration. Furthermore, according to the above invention, it is possible to enlarge the dynamic range without (i) increasing a power source voltage for the photosensor or (ii) increasing a size of an element in order to increase the electric potential at the gate.

Thus, the above invention makes it possible to provide a display device including a display region provided with a photosensor, which display device is capable of enlarging a dynamic range of a sensor output, without (a) increasing a power source voltage for the photosensor or (b) reducing an aperture ratio of a pixel.

In order to solve the foregoing problems, the display device of the present invention includes a capacitor having a first end connected with the gate, the capacitor having a second end which is opposite to the first end and to which a second pulse signal having a second pulse is inputted, the second pulse rising from a low level to a high level before a timing at which the first pulse rises, and the second pulse falling from the high level to the low level after the timing at which the first pulse rises.

According to the above invention, the second pulse of the second pulse signal is applied to the gate of the TFT via the capacitor before the first pulse rises. This makes it possible to increase the electric potential at the gate in advance. Therefore, when the first pulse is applied to the drain of the TFT, the electric potential at the gate increases quite largely.

In order to solve the foregoing problems, the display device of the present invention is configured such that the second pulse falls from the high level to the low level after a timing at which the first pulse falls.

According to the above invention, it is possible to detect the output of the source follower throughout a period of the first pulse. With this, a period for detecting the output of the source follower can be easily set only on the basis of the timing of the period of the first pulse.

In order to solve the foregoing problems, the display device of the present invention is configured such that (i) an electric potential of the high level of the first pulse and (ii) an electric potential of the high level of the second pulse are equal to each other.

According to the above invention, it is possible to supply both of (i) the high level of the first pulse and (ii) the high level of the second pulse by using a single power source. This makes it possible to prevent the configuration of the power source section from becoming complex.

In order to solve the foregoing problems, the display device of the present invention is configured such that, at an earlier one of (i) a timing at which the first pulse ends and (ii) a timing at which the second pulse ends, the output of the source follower has an electric potential lower than an electric potential obtained by subtracting (i) a threshold voltage of the thin-film transistor from (ii) an electric potential at the gate of the thin-film transistor.

According to the above invention, even if an output period in which the source follower performs output is too short to allow the output of the source follower to reach an electric potential which puts the TFT into a non-conductive state, it is possible to easily distinguish between light and dark, thanks to the enlarged dynamic range of the output of the source follower. This makes it possible to detect light with a high resolution and at a high speed.

In order to solve the foregoing problems, the display device of the present invention is configured such that the photosensor and the thin-film transistor are provided in each pixel row.

According to the above invention, the photosensor and the TFT are provided for each pixel row. Therefore, in a case where light detection is performed for the pixel rows one by one in order by scanning, even if each scanning period is short and accordingly the output period in which the source follower performs output becomes short, it is possible to easily distinguish between light and dark, thanks to the enlarged dynamic range of the output of the source follower. This makes it possible to detect light with a high resolution and at a high speed.

In order to solve the foregoing problems, the display device of the present invention is configured such that the display region is made of amorphous silicon.

According to the above invention, even in the case where the TFT is made of amorphous silicon and accordingly has a lower ability as an amplifier, it is possible to easily distinguish between light and dark, thanks to the enlarged dynamic range of the output of the source follower.

In order to solve the foregoing problems, the display device of the present invention is configured such that the first pulse signal is generated by a circuit provided in the display region in a form of a chip on glass.

According to the above invention, it is possible to use, as the circuit which generates the first pulse signal and is provided by COG (Chip On Glass), an IC chip made according to conventional architecture with the power source voltage unchanged. This makes it possible to prevent an increase in cost.

In order to solve the foregoing problems, the display device of the present invention is configured such that the photosensor is a diode-connected transistor, and the photosensor includes a cathode connected with the gate of the thin-film transistor.

According to the above invention, since an amount of a leakage current flowing from the cathode of the photosensor to the anode of the photosensor changes according to the intensity of the emitted light, it is possible to derive the output of the source follower from the electric potential at the gate of the TFT, which electric potential corresponds to the leakage current.

In order to solve the foregoing problems, the display device of the present invention is configured such that the display region includes liquid crystal as a display element.

According to the above invention, in a liquid crystal display device provided with a photosensor, it is possible to easily distinguish between light and dark, thanks to the enlarged dynamic range of the output of the source follower.

In order to solve the foregoing problems, a method of the present invention for driving a display device is a method for driving a display device of matrix type, the display device including: photosensors, provided in a display region, each for outputting a signal corresponding to an intensity of light emitted to the photosensor; thin-film transistors of n-channel type, the thin-film transistors each serving as a source follower including a gate to which the signal is inputted; and light intensity detecting means for detecting the intensity of the light by detecting an output of the source follower, which is the thin-film transistor, said method including: inputting a first pulse signal having a first pulse to a drain of each thin-film transistor, the first pulse rising from a low level to a high level in a state where the signal is inputted to the gate of the thin-film transistor.

According to the above invention, if the first pulse of the first pulse signal is applied to the drain of the TFT in the state where the signal outputted by the photosensor is inputted to the gate of the TFT, an electric potential at the gate increases due to capacitive coupling between the gate and the drain of the TFT. In addition, the electric potential at the gate further increases due to capacitive coupling between the gate and the source of the TFT, which has become conductive. Accordingly, the electric potential at the gate of the TFT increases more largely as compared with the conventional configuration. Therefore, the output of the source follower, which output has an electric potential corresponding to the electric potential at the gate, also has an electric potential higher than that obtained in the conventional configuration.

Thus, the output of the source follower is increased, i.e., the dynamic range of the output of the photosensor is enlarged. With this, it is possible to detect, by the light intensity detecting means, a greater light-dark difference with respect to the light emitted to the photosensor, as compared with that of the conventional configuration. Furthermore, according to the above invention, it is possible to enlarge the dynamic range without (i) increasing a power source voltage for the photosensor or (ii) increasing a size of an element in order to increase the electric potential at the gate.

Thus, the above invention makes it possible to provide a method for driving a display device including a display region provided with a photosensor, which method is capable of enlarging a dynamic range of a sensor output, without (a) increasing a power source voltage for the photosensor or (b) reducing an aperture ratio of a pixel.

In order to solve the foregoing problems, the method of the present invention for driving the display device includes: inputting, via a capacitor, a second pulse signal having a second pulse to the gate, the second pulse rising from a low level to a high level before a timing at which the first pulse rises, and the second pulse falling from the high level to the low level after the timing at which the first pulse rises.

According to the above invention, the second pulse of the second pulse signal is applied to the gate of the TFT via the capacitor before the first pulse rises. This makes it possible to increase the electric potential at the gate in advance. Therefore, when the first pulse is applied to the drain of the TFT, the electric potential at the gate increases quite largely.

In order to solve the foregoing problems, in the method of the present invention for driving the display device, the second pulse falls from the high level to the low level after a timing at which the first pulse falls.

According to the above invention, it is possible to detect the output of the source follower throughout a period of the first pulse. With this, a period for detecting the output of the source follower can be easily set only on the basis of the timing of the period of the first pulse.

In order to solve the foregoing problems, in the method of the present invention for driving the display, (i) an electric potential of the high level of the first pulse and (ii) an electric potential of the high level of the second pulse are equal to each other.

According to the above invention, it is possible to supply both of (i) the high level of the first pulse and (ii) the high level of the second pulse by using a single power source. This makes it possible to prevent the configuration of the power source section from becoming complex.

In order to solve the foregoing problems, the method of the present invention for driving the display device includes: setting a period of the first pulse so that, at an earlier one of (i) a timing at which the first pulse ends and (ii) a timing at which the second pulse ends, the output of the source follower has an electric potential lower than an electric potential obtained by subtracting (i) a threshold voltage of the thin-film transistor from (ii) an electric potential at the gate of the thin-film transistor.

According to the above invention, even if an output period in which the source follower performs output is too short to allow the output of the source follower to reach an electric potential which puts the TFT into a non-conductive state, it is possible to easily distinguish between light and dark, thanks to the enlarged dynamic range of the output of the source follower. This makes it possible to detect light with a high resolution and at a high speed.

Advantageous Effects of Invention

As described above, a display device of the present invention is a display device of matrix type, including: photosensors, provided in a display region, each for outputting a signal corresponding to an intensity of light emitted to the photosensor; thin-film transistors of n-channel type, the thin-film transistors each serving as a source follower including a gate to which the signal is inputted; and light intensity detecting means for detecting the intensity of the light by detecting an output of the source follower, which is the thin-film transistor, each thin-film transistor including a drain to which a first pulse signal having a first pulse is inputted, the first pulse rising from a low level to a high level in a state where the signal is inputted to the gate of the thin-film transistor.

Thus, the above invention makes it possible to provide a display device including a display region provided with a photosensor, which display device is capable of enlarging a dynamic range of a sensor output, without (a) increasing a power source voltage for the photosensor or (b) reducing an aperture ratio of a pixel.

As described above, a method of the present invention for driving a display device is a method for driving a display device of matrix type, the display device including: photosensors, provided in a display region, each for outputting a signal corresponding to an intensity of light emitted to the photosensor; thin-film transistors of n-channel type, the thin-film transistors each serving as a source follower including a gate to which the signal is inputted; and light intensity detecting means for detecting the intensity of the light by detecting an output of the source follower, which is the thin-film transistor, said method including: inputting a first pulse signal having a first pulse to a drain of each thin-film transistor, the first pulse rising from a low level to a high level in a state where the signal is inputted to the gate of the thin-film transistor.

Thus, the above invention makes it possible to provide a method for driving a display device including a display region provided with a photosensor, which method is capable of enlarging a dynamic range of a sensor output, without (a) increasing a power source voltage for the photosensor or (b) reducing an aperture ratio of a pixel.

DESCRIPTION OF EMBODIMENTS

The following will describe one embodiment of the present invention with reference to FIGS. 1 through 5.

Figure 4:
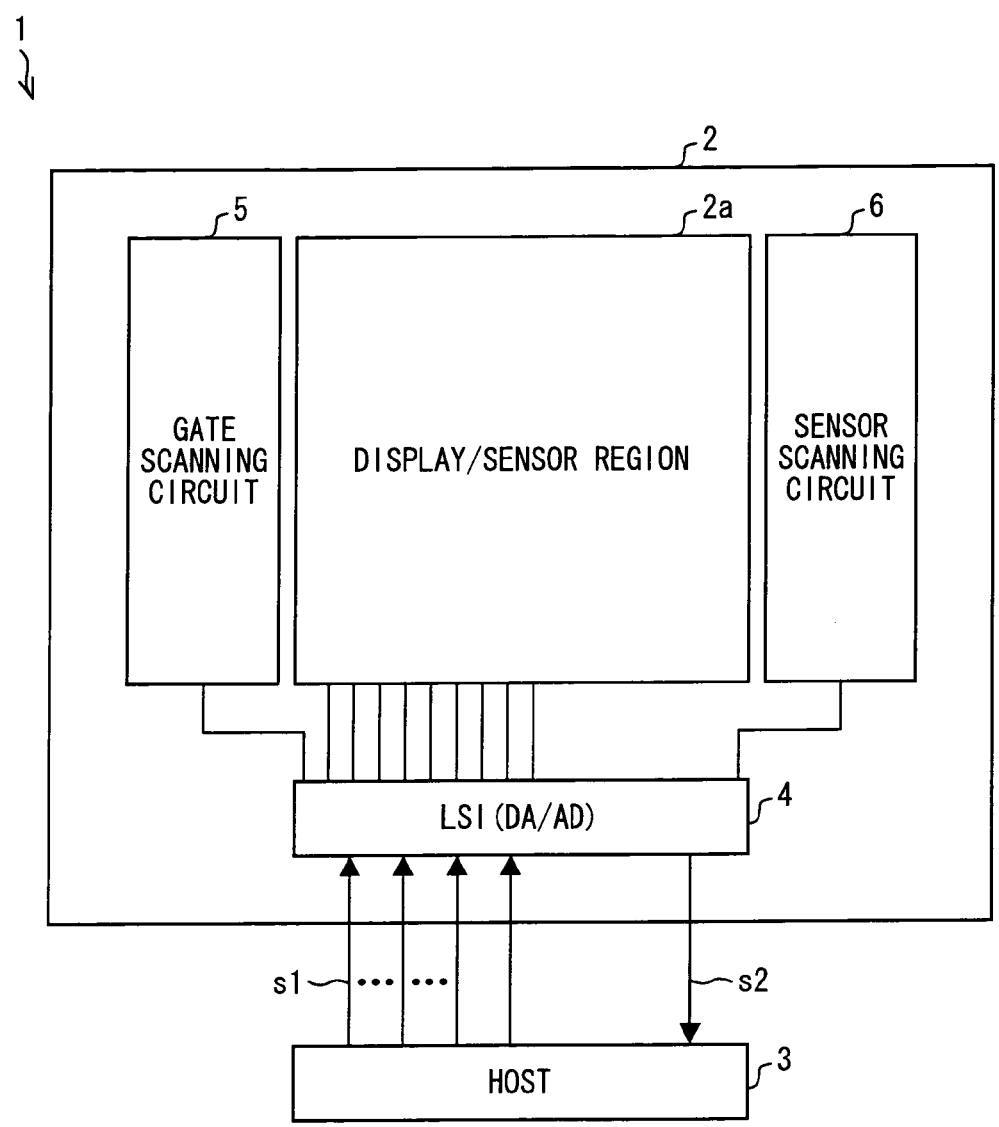
FIG. 4, related to the embodiment of the present invention, is a block diagram illustrating a configuration of a display device.

FIG. 4 shows a configuration of a liquid crystal display device 1 (display device) of the present embodiment.

The liquid crystal display device 1 is an active matrix display device, and includes a display panel 2 and a host controller 3.

The display panel 2 includes a display/sensor region 2a, a source driver 4 (i.e., a circuit for driving data signal lines), a gate scanning circuit 5 (i.e., a circuit for driving scanning signal lines), and a sensor scanning circuit 6. The display/sensor region 2a is included in the display panel 2 and is made of amorphous silicon, polysilicon, CG (Continuous Grain) silicon, microcrystalline silicon, or the like. Further, the display/sensor region 2a includes pixels (one of which is shown in later-described FIG. 5) and sensor circuits SC, the pixels and the sensor circuits SC being arranged in a matrix. The source driver 4 is an LSI chip directly mounted on the display panel 2, and is provided in the form of a so-called COG (Chip On Glass). The source driver 4 outputs, to the data signal lines, a data signal for the pixel in the display/sensor region 2a, and processes an output from the sensor circuit. The gate scanning circuit 5 outputs a scanning signal to the scanning signal line, which scanning signal is used to write the data signal to the pixel in the display/sensor region 2a. The sensor scanning circuit 6 supplies a necessary voltage to the sensor circuit in the display/sensor region 2a.

The host controller 3 is a control board provided in the outside of the display panel 2. The host controller 3 supplies, to the source driver 4, (i) display data to be supplied to the source driver 4, (ii) a clock signal, a start pulse, etc. to be supplied to the gate scanning circuit 5, and (iii) a clock signal, a start pulse, a power source voltage, etc. to be supplied to the sensor scanning circuit 6. The signals and the voltages are supplied to the gate scanning circuit 5 and the sensor scanning circuit 6 via the source driver 4.

Figure 5:
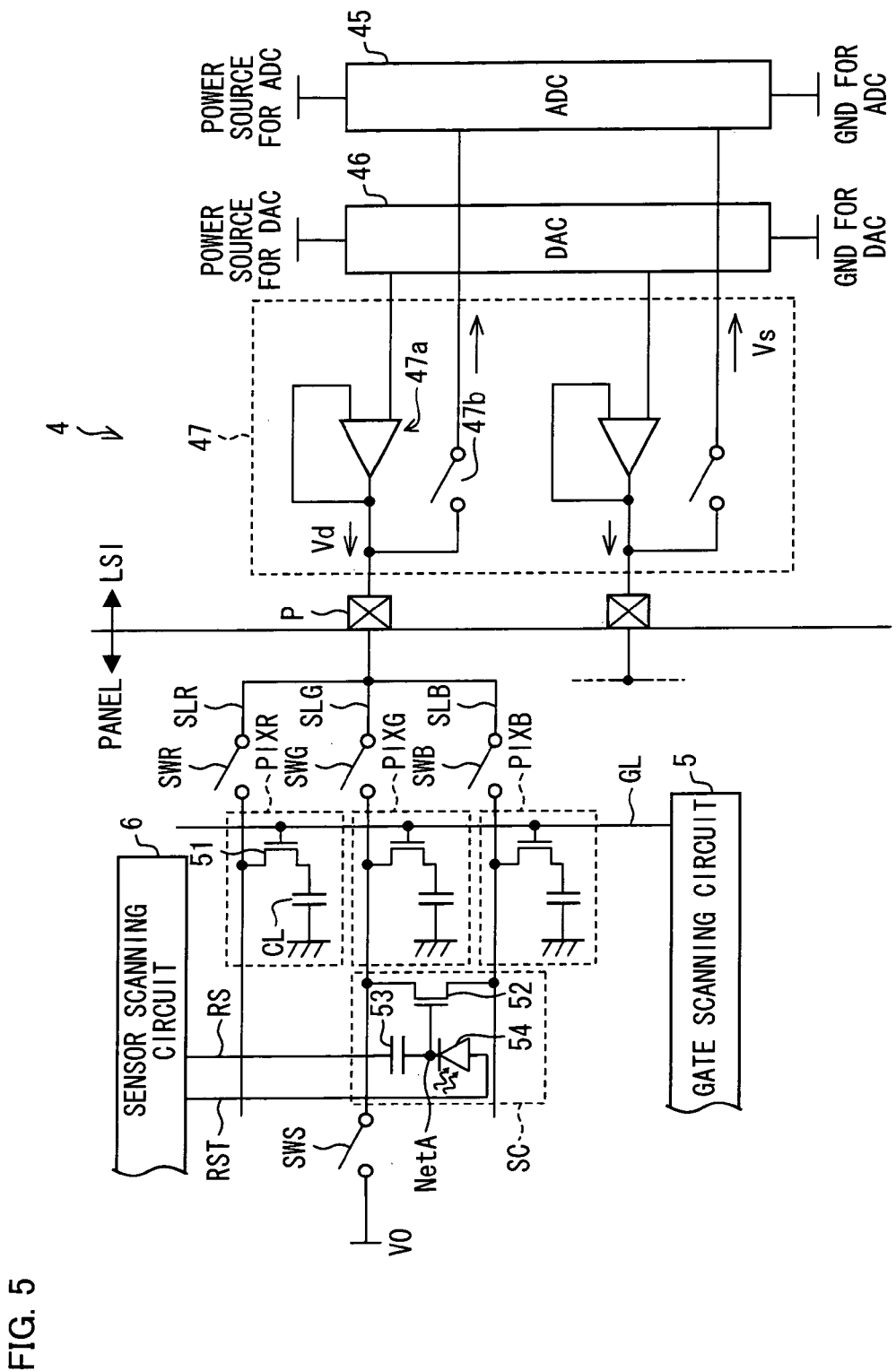
FIG. 5 is a circuit block diagram illustrating a configuration of a display panel included in the display device shown in FIG. 4.

FIG. 5 shows a connection relationship between the display/sensor region 2a and the source driver 4.

In the display/sensor region 2a, each pixel is constituted by a group including a picture element PIXR for "R", a picture element PIXG for "G", and a picture element PIXB for "B". For each pixel, one sensor circuit SC is provided. In each pixel, the picture element PIXR, the picture element PIXG, and the picture element PIXB are driven by time division in one horizontal period. Each picture element is provided at an intersection of one scanning signal line GL and its corresponding data signal line SL (for "R", SLR; for "G", SLG; for "B", SLB). Further, a data signal is written into a liquid crystal capacitor CL by a TFT 51, which serves as a selection element. The data signal line SLR, the data signal line SLG, and the data signal line SLB are connected with a single one of terminals P of the source driver 4, via a switch SWR, a switch SWG, and a switch SWB, respectively. Note that the colors expressed by the picture elements are not limited to the three color "RGB" exemplified above, and may be any colors.

Figure 6:
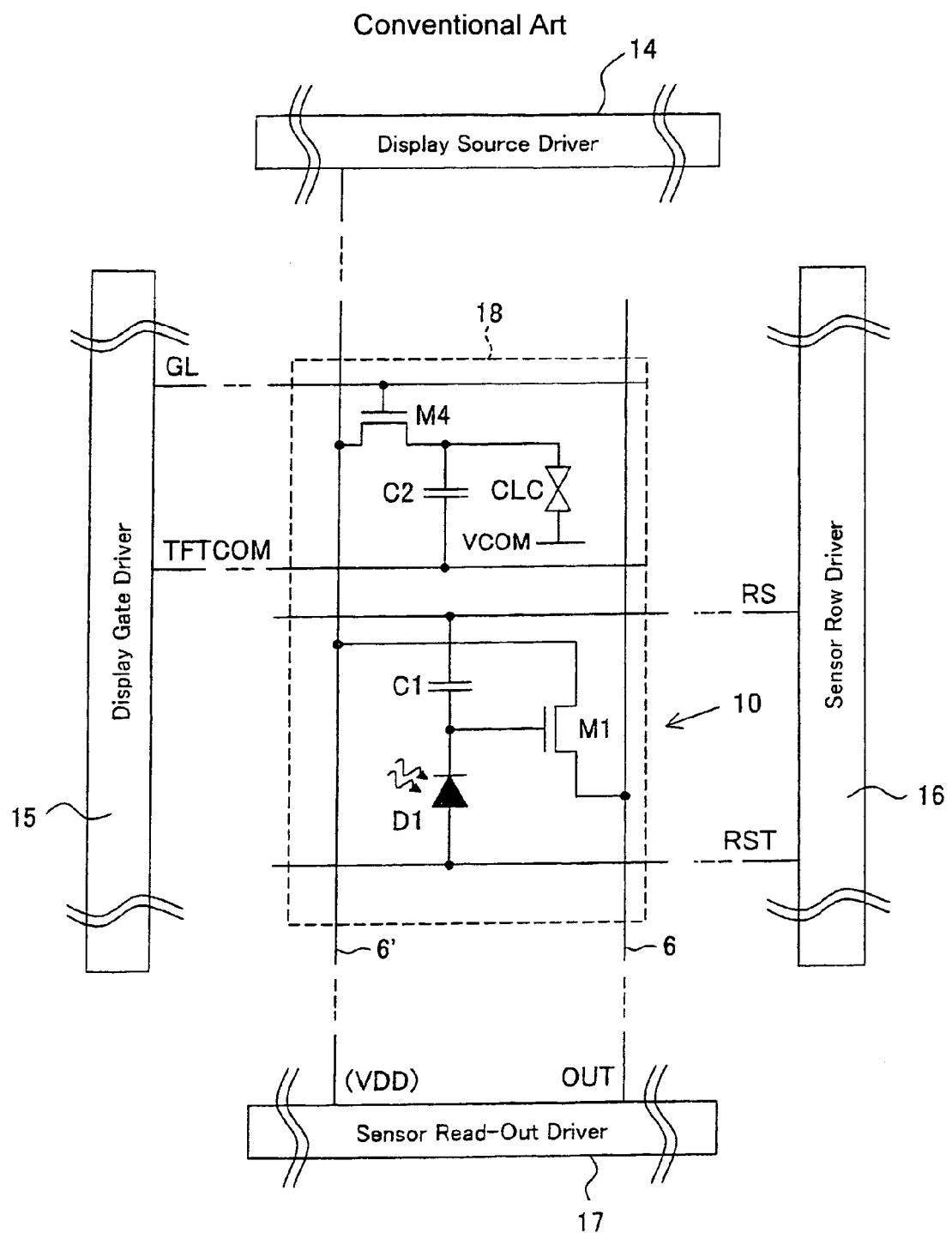
FIG. 6, related to the conventional art, is a circuit block diagram illustrating a configuration of a display device provided with a photosensor.
Figure 7:
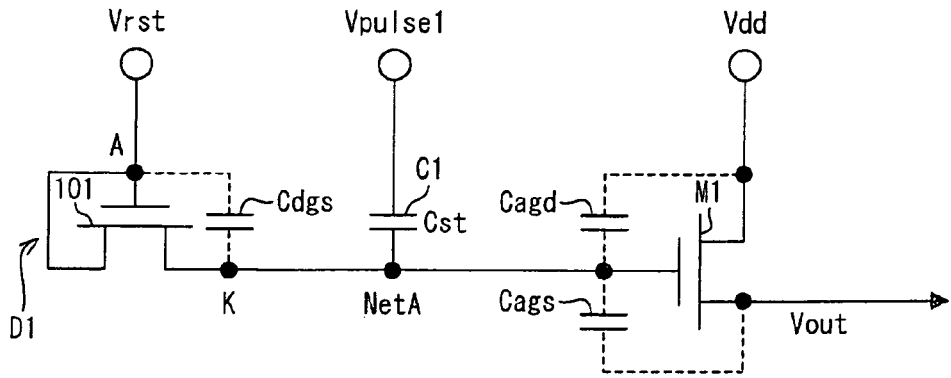
FIG. 7, related to the conventional art, is a circuit diagram illustrating a configuration of a sensor circuit.
Figure 8:
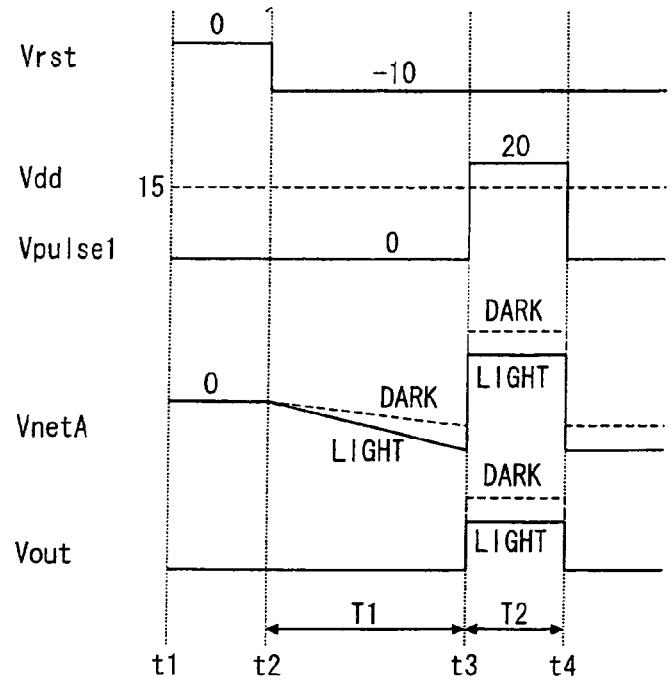
FIG. 8 is a timing chart illustrating how the sensor circuit shown in FIG. 7 operates.

Each sensor circuit SC is provided so as to be connected with corresponding picture elements in a region opposite to a corresponding terminal P. Between the region and the terminal P, there provided its corresponding switches SWR, SWG, and SWB. Further, the sensor circuit SC includes an amplifier TFT (TFT) 52 of n-channel type, a capacitor 53, and a photosensor 54. The amplifier TFT 52 has a similar configuration to that of the amplifier TFT M1 shown in FIG. 6, the capacitor 53 has a similar configuration to that of the capacitor C1 shown in FIG. 6, and the photosensor 54 has a similar configuration to that of the photosensor D1 shown in FIG. 6. A drain terminal of the amplifier TFT 52 is connected with the data signal line SLG, whereas a source terminal of the amplifier TFT 52 is connected with the data signal line SLB. The capacitor 53 and the photosensor 54 are connected with each other in series at a point located on the cathode side of the photosensor 54. Further, the point, which is a node NetA, is connected with a gate of the amplifier TFT 52. The other end of the capacitor 53 is connected with the sensor scanning circuit 6 via a corresponding one of row selection lines RS, which are provided for their respective pixel rows. Further, an anode of the photosensor 54 is connected with the sensor scanning circuit 6 via a corresponding one of reset wires RST, which are provided for their respective pixel rows. A row selection line RS for each pixel row is connected with the other ends of all capacitors 53 provided in the pixel row. A reset wire RST for each pixel row is connected with anodes of all photosensors 54 provided in the pixel row. Further, one end of the data signal line SLG, which end is located on the opposite side to the terminal P, is connected with a power source V0 via a switch SWS.

In the source driver 4, output terminals of the source input/output circuit 47 are connected with their corresponding terminals P. The source output circuit 47 includes stages each constituted by a pair including (i) a buffer 47a which is made of a voltage follower of an operational amplifier and (ii) a switch section 47b. Each stage is connected with a corresponding one of the terminals P. An input terminal of the buffer 47a is connected with an output terminal of the digital-analog conversion circuit 46, whereas an output terminal of the buffer 47a is connected with the terminal P. The switch section 47b is a circuit for connecting an input terminal of the analog-digital conversion circuit 45 with the terminal P and disconnecting the input terminal of the analog-digital conversion circuit 45 from the terminal P. The digital-analog conversion circuit 46 uses a power source and GND each of which is provided exclusively for the digital-analog conversion circuit 46, and the analog-digital conversion circuit 45 uses a power source and GND each of which is provided exclusively for the analog-digital conversion circuit 45.

In a display period, in which display is performed by the picture elements in the display/sensor region 2a, the power source for the buffers 47a turns on, and the switch section 47b disconnects the input terminal of the analog-digital conversion circuit 45 from the terminal P. As a result, source outputs (data signals) Vd of RGB are supplied to the display/sensor region 2a in time series. In the display/sensor region 2a, the corresponding switches SWR, SWG, and SWB turn on one by one in order. Consequently, the source outputs Vd are supplied to the data signal lines SLR, SLG, and SLB in order, so that display is performed by the picture elements PIXR, PIXG, and PIXB. At this moment, the switch SWS is off.

In a sensor driving period, in which (i) an intensity of light emitted by a backlight or (ii) an intensity of light externally emitted is detected in the display/sensor region 2a, the switches SWR, SWG, and SWB are turned off, whereas the switch SWS is turned on, so that the data signal line SLG is connected with the power source V0. Further, by charging in advance the capacitor 53 to a predetermined voltage using a forward-direction voltage inputted from the sensor scanning circuit 6 to the photosensor 54, the gate of the amplifier TFT 52 is allowed to have a voltage corresponding to the intensity of the light emitted to the photosensor 54, during the period for detecting the light intensity. This allows the data signal line SLB to have a voltage corresponding to the detected light intensity. Therefore, the switch SWB is turned on, and the data signal line SLB is connected with the terminal P of the source driver 4.

While the above operation is performed, in the source driver 4, the power supply for the buffer 47a is cut off, so that an output of the buffer 47a goes into a high impedance state, and the switch section 47b connects the input terminal of the analog-digital conversion circuit 45 with the terminal P. In response to this, a sensor voltage Vs, which is an analogue output of the sensor circuit SC, is inputted to the analog-digital conversion circuit 45. The analog-digital conversion circuit 45 converts the inputted sensor voltage Vs into digital data. The digital data is used by a latter process circuit as a detection result of the light intensity.

Thus, the source driver 4 serves as light intensity detecting means for detecting the intensity of the light emitted to the photosensor 54.

Figure 1:
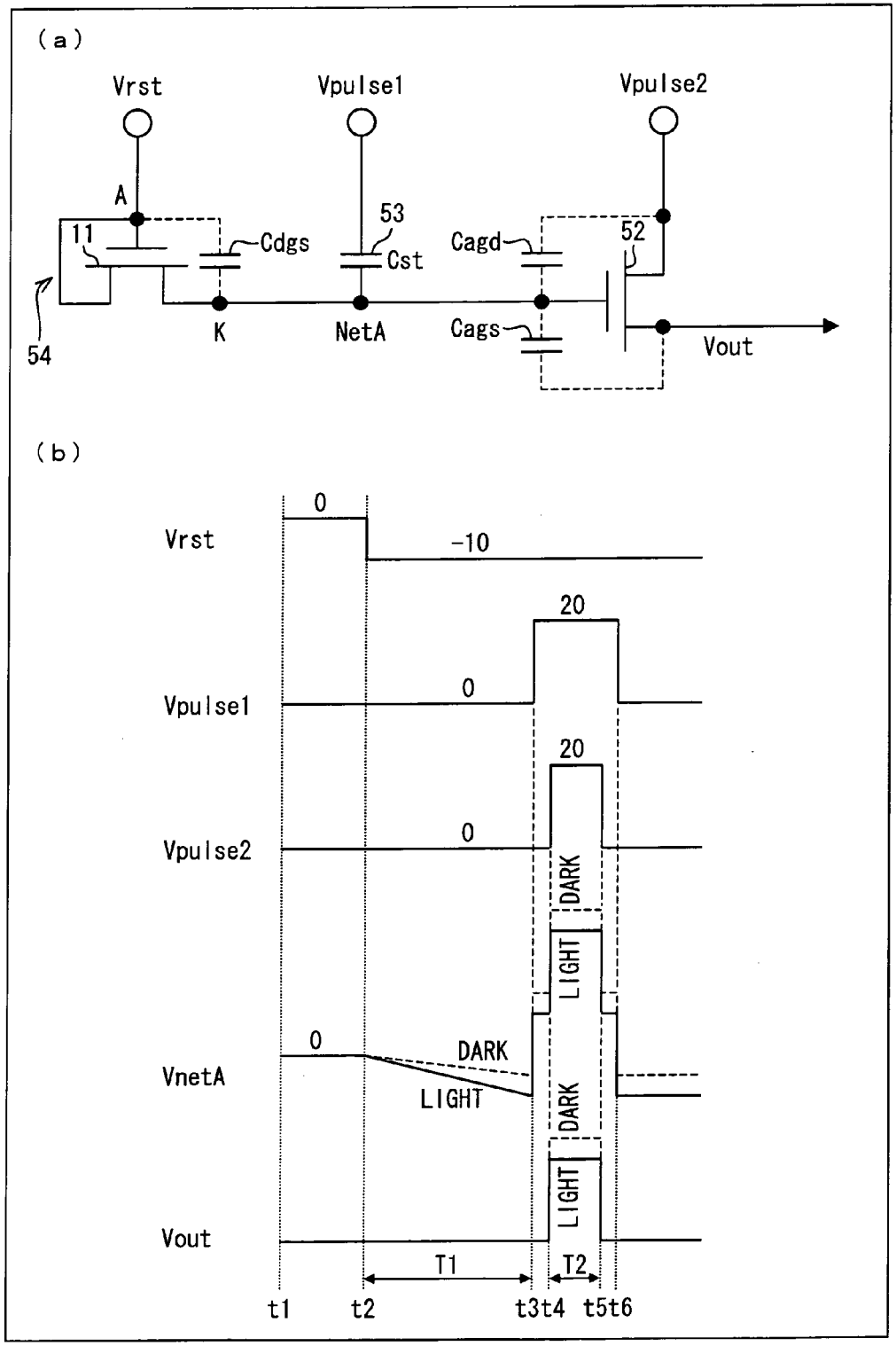
FIG. 1, related to an embodiment of the present invention, is a view illustrating a sensor circuit. (a) of FIG. 1 is a circuit diagram illustrating a configuration of the sensor circuit, whereas (b) of FIG. 1 is a timing chart illustrating how the sensor circuit shown in (a) of FIG. 1 operates.

Next, with reference to FIG. 1, the following will specifically describe (i) a configuration of each sensor circuit SC in the liquid crystal display device 1 having the above configuration and (ii) how such the sensor circuit SC operates.

(a) of FIG. 1 shows a configuration of the sensor circuit SC in detail. During the sensor driving period, the drain of the amplifier TFT 52 is supplied with a voltage (first pulse signal) Vpulse2 from the power source V0 via the switch SWS and the data signal line SLG. The source of the amplifier TFT 52 outputs a sensor output voltage Vout to the data signal line SLB, which serves as a sensor output wire. Between the gate and the drain of the amplifier TFT 52, a capacitor Cagd is formed. Between the gate and the source of the amplifier TFT 52, a capacitor Cags is formed.

The photosensor 54 is constituted by a diode-connected TFT (transistor) 11. The photosensor 54 includes (i) an anode A, which is constituted by connection of a gate and a drain of the TFT 11, and (ii) a cathode K, which is constituted by a source of the TFT 11. The anode A is supplied with a voltage Vrst from the reset wire RST. Between the anode A and the cathode K, i.e., between the gate and the source of the TFT 11, a capacitor Cdgs is formed.

The capacitor 53 has a capacitor value Cst. Further, one end of the capacitor 53, which end is located on the row selection wire RS side, is supplied with a voltage (second pulse signal) Vpulse1 from the row selection wire RS.

Next, with reference to (b) of FIG. 1, the following will describe how the sensor circuit SC having the above configuration operates.

In the sensor driving period, the data signal line SLG is disconnected from the source driver 4, since the switch SWG is turned off. On the other hand, the data signal line SLB is connected with the source driver 4, since the switch SWB is turned on. Furthermore, in the source driver 4, the corresponding terminal P is connected with the input terminal of the analog-digital conversion circuit 45 by the switch section 47b. At a time t1, which is the beginning of the sensor driving period, the voltage Vrst, which is applied to the reset wire RST by the sensor scanning circuit 6, is set to a high level (here, 0V). This causes the photosensor 54 to become conductive in a forward direction, so that an electric potential. VnetA at the node NetA becomes a high level (here, 0V). Further, at the time t1, the voltage Vpulse1, which is applied to the row selection wire RS by the sensor scanning circuit 6, is set to a low level (here, 0V), and the voltage Vpulse2, which is applied to the data signal line SLG by the power source V0, is set to a low level (here, 0V).

Subsequently, at a time t2, the sensor scanning circuit 6 sets the voltage Vrst to a low level (here, −10V). At the time t2, the photosensor 54 is put into an inverse-bias state, since the anode A has a lower electric potential than that of the cathode K.

From the time t2, a charging period T1 begins. In the charging period T1, the node NetA is charged according to an intensity of light emitted to the photosensor 54. When light is emitted to the photosensor 54, an amount of a leakage current flowing from the cathode K to the anode A changes according to the intensity of the emitted light. In a light part, the amount of leakage current is large; therefore an electric potential at the cathode K, i.e., the electric potential VnetA is reduced rapidly. On the other hand, in a dark part, the amount of leakage current is small; therefore, the electric potential VnetA is reduced slowly. The electric potential VnetA in the charging period T1 becomes a signal corresponding to the intensity of light emitted to the photosensor 54.

At a time t3, at which the charging period T1 ends, the sensor scanning circuit 6 sets the voltage Vpulse1 to a high level (here, 20V). In response to this, the electric potential VnetA is boosted from a negative electric potential to a positive electric potential, due to capacitive coupling by the capacitor 53. At this moment, an electric potential difference between the light part and the dark part is maintained. However, since the voltage Vpulse2 is still at the low level, an electric current is not flown into the amplifier TFT 52 yet.

Subsequently, at a time t4 after the time t3, the voltage Vpulse2 of the power source V0 is set to a high level (here, 20V). In response to this, the amplifier TFT 52 becomes conductive. However, the electric potential VnetA, i.e., an electric potential at the gate of the amplifier TFT 52 is further boosted by a bootstrap effect through capacitive coupling between the capacitor Cagd and the capacitor Cags. Thanks to the boosting achieved by inputting the pulse of the voltage Vpulse2 to the drain of the amplifier TFT 52, the electric potential VnetA becomes higher as compared with a case where a constant voltage is always applied to the drain of the amplifier TFT 52. Thus, the amplifier TFT 52 outputs, from the source, an output voltage Vout which is higher than that achieved with the conventional configuration. Here, note "Vout≤(high level of Vpulse2)". Therefore, in a case where the period T2 is set to end at the same time with or after turning off of the amplifier TFT 52, the electric potential VnetA achieves an effect of increasing the output voltage Vout more largely as compared with the conventional configuration, i.e., widens a light-dark difference with respect to the output voltage Vout more largely as compared with the conventional configuration, within a range of "VnetA≤(high level of Vpulse2)+Vth". On the other hand, in a case where the period T2 is set to end before turning off of the amplifier TFT 52, if the electric potential VnetA is set to satisfy "VnetA>(high level of Vpulse2)+Vth", the output voltage Vout stops increasing when reaching a value close to the high level of Vpulse2 at some point in time during the period T2. However, since the output voltage Vout changes faster than that in the conventional configuration, the electric potential VnetA achieves an effect of widening, until the output voltage Vout stops increasing, a light-dark difference with respect to the output voltage Vout more largely as compared with the conventional configuration. From the time t4, the output period T2, which is for sensor output, begins.

Here, assume that a total capacitor value Ctotal is expressed by:

$$Ctotal = Cdgs + Cst + Cagd + Cags$$

(each capacitor value in the right-hand side is indicated by a name of the corresponding capacitor), and $$\alpha = Cst/Ctotal, \text{ and}$$

$$\beta = Cagd/Ctotal.$$

Then, a boost value $\Delta V1netA$, which is a value by which the electric potential VnetA is boosted by the voltage Vpulse1, is expressed by:

$$\Delta V1netA = \alpha \times Vpulse1_{p\text{-}p}.$$

Further, a boost value $\Delta V2netA$, which is a value by which the electric potential VnetA is boosted by the voltage Vpulse2, is expressed by:

$$\Delta V2netA = \beta \times Vpulse2_{p\text{-}p}.$$

Note that "Vpulse1$_{p\text{-}p}$" represents a peak-to-peak voltage of Vpulse1, whereas "Vpulse2$_{p\text{-}p}$" represents a peak-to-peak voltage of Vpulse2. In the above example, each of the Vpulse1$_{p\text{-}p}$ and Vpulse2$_{p\text{-}p}$ is 20V.

Thus, a total boost value $\Delta VallnetA$, which is a value by which the electric potential VnetA is boosted by the voltage Vpulse1 and the voltage Vpulse2, is expressed by:

$$\Delta VallnetA = \Delta V1netA + \Delta V2netA.$$

Here, (i) a voltage of the present embodiment to be applied to the drain of the amplifier TFT at the timing (=time t3) at which the pulse of the voltage Vpulse1 rises is different from (ii) a voltage of the previously-described conventional configuration to be applied to the drain of the amplifier TFT at the timing (=time t3). Therefore, (i) $\Delta V1netA$ and (ii) $\Delta VnetA$, which is achieved by the conventional configuration, are slightly different from each other; however, $\Delta V1netA$ and $\Delta VnetA$ are almost equal to each other. Accordingly, $\Delta VallnetA$ is greater by approximately $\Delta V2netA$ than $\Delta VnetA$, which is achieved by the conventional configuration. Consequently, the output voltage Vout, which has a value corresponding to the electric potential VnetA, becomes greater than that of the conventional configuration.

By reading the output voltage Vout by the source driver 4 in the output period T2, it is possible to detect the sensor output of the photosensor 54, i.e., the intensity of the light emitted to the photosensor 54. Here, since the output voltage Vout has an enlarged dynamic range, the analog-digital conversion circuit 45 has an enlarged input dynamic range. Therefore, the analog-digital conversion circuit 45 can read a light-dark difference with a high resolution.

At a time t5, at which the output period T2 ends, the voltage Vpulse2 of the power source V0 is set to a low level (here, 0V). Subsequently, at a time t6, the voltage Vpulse1, which is applied by the sensor scanning circuit 6, is set to a low level (here, 0V). Thus, the sensor driving period ends.

In the above operation for driving the sensor circuit SC, the pulse (second pulse) of the voltage Vpulse1 is applied to the node NetA, i.e., the gate of the amplifier TFT 52 via the capacitor 53 during a period from the time t3 to the time t6; whereas the pulse (first pulse) of the voltage Vpulse2 is applied to the drain of the amplifier TFT 52 during the output period T2.

Figure 2:
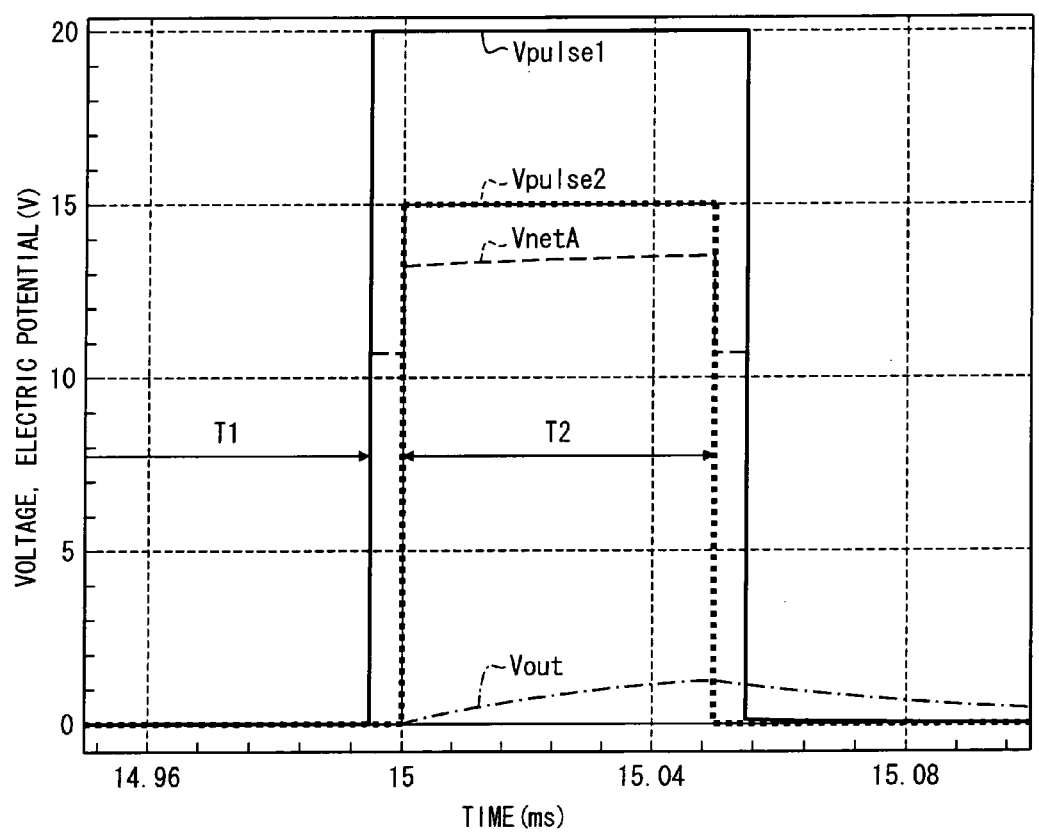
FIG. 2 is a waveform chart illustrating waveforms of voltages and an electric potential, which specifically shows how the sensor circuit shown in FIG. 1 operates.

FIG. 2 shows a concrete example of waveforms of voltages and an electric potential observed during the output period T2.

In the period T2, the electric potential VnetA increases gradually; however, the electric potential VnetA is almost constant. On the other hand, the output voltage Vout continuously increases with a time constant corresponding to the load(s) provided in the downstream of the source of the amplifier TFT 52.

Figure 3:
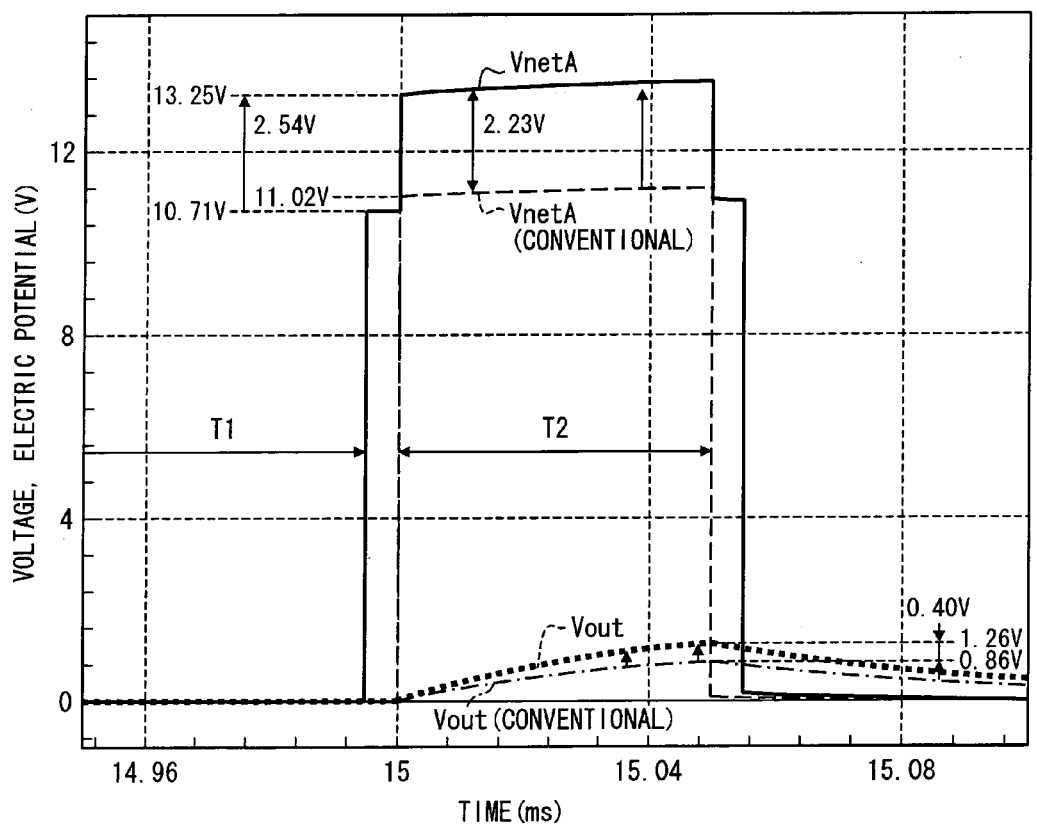
FIG. 3 is a waveform chart comparing (i) part of the waveforms shown in FIG. 2 with (ii) waveforms observed in conventional art.
Figure 9:
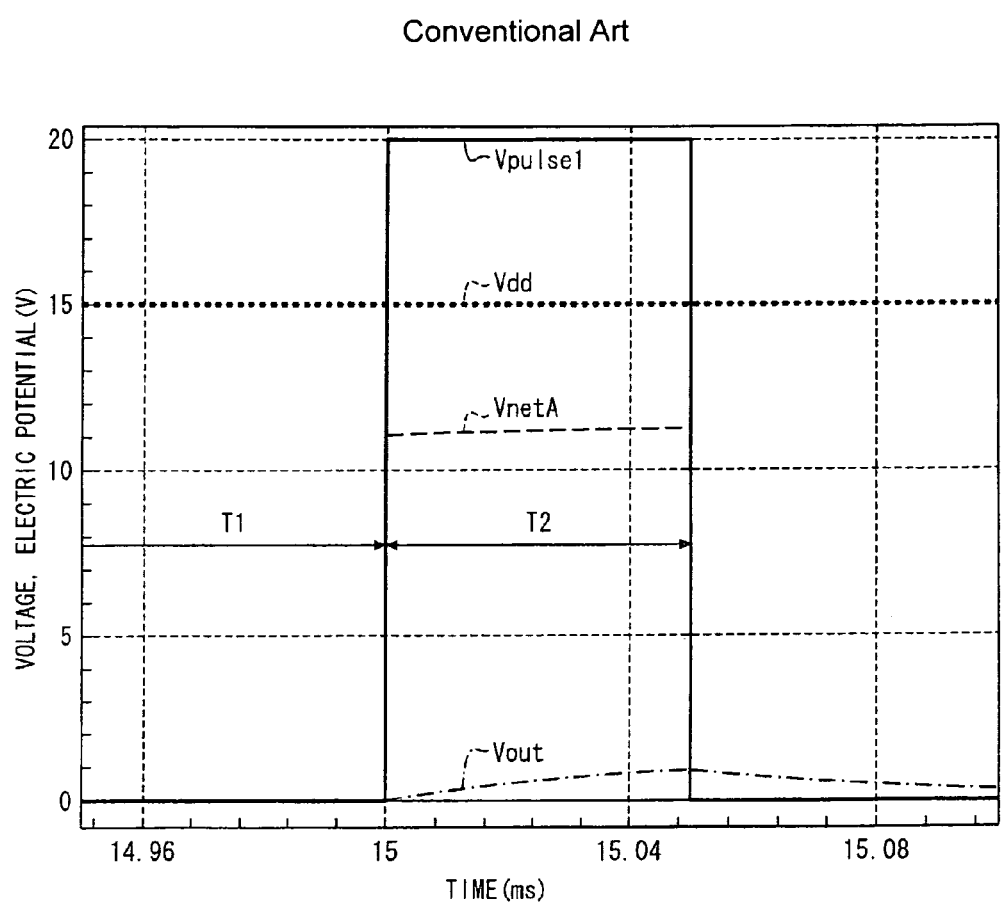
FIG. 9 is a waveform chart illustrating waveforms of voltages and an electric potential, which specifically shows how the sensor circuit shown in FIG. 7 operates.

FIG. 3 shows (i) waveforms of the electric potential VnetA and the output voltage Vout of the present embodiment (the ones shown in FIG. 2) and (ii) waveforms of the electric potential VnetA and the output voltage Vout of the conventional configuration (the ones shown in FIG. 9). The electric potential VnetA of the conventional configuration, which is indicated by broken lines, is boosted to approximately 11.02V in the output period T2. On the other hand, the electric potential VnetA of the present embodiment, which is indicated by continuous lines, is once boosted to approximately 10.71V at the end of the period T1, and thereafter is further boosted to approximately 13.25V, which is higher by 2.54V than 10.71V, in the output period T2. Thus, the electric potential VnetA of the present embodiment is higher by approximately 2.23V than that of the conventional configuration.

Further, the output voltage Vout of the conventional configuration is 0.86V at the end of the output period T2, whereas the output voltage Vout of the present embodiment is 1.26V, which is higher by 0.40V than that of the conventional configuration.

Thus, in the present embodiment, the pulse is applied to the drain of the amplifier TFT 52 in the output period T2, whereby the electric potential VnetA is boosted. This boost effect is greater than a bootstrap effect achieved in a case where a constant voltage is always applied to the drain. Therefore, the present embodiment can make the electric potential VnetA higher than that achieved by the conventional configuration. Accordingly, the present embodiment can increase a light-dark difference with respect to the output voltage Vout. Further, it is possible to boost the electric potential VnetA largely merely by applying the pulse of the voltage Vpulse2 to the drain of the amplifier TFT 52. However, in addition to this, as in the example above, applying in advance the pulse of the voltage Vpulse1 to the node NetA via the capacitor 53 results in two-stage boosting, thereby making it possible to boost the node NetA quite largely.

In the above example, a timing at which the pulse of the voltage Vpulse1 falls is set so as to be after a timing at which the pulse of the voltage Vpulse2 falls. However, the present invention is not limited to this. Alternatively, the timing at which the pulse of the voltage Vpulse1 falls may be set so as to be after a timing at which the pulse of the voltage Vpulse2 rises but before the timing at which the pulse of the voltage Vpulse2 falls. In this case, the output period T2 begins at the timing at which the pulse of the voltage Vpulse2 rises, and ends at the timing at which the pulse of the voltage Vpulse1 falls. In this case, the output voltage Vout may be detected during this period.

In the sensor circuit SC, each of the capacitors Cdgs, Cst, Cagd, and Cags may be a parasitic capacitor or a capacitor intentionally formed by opposing electrodes. In order to increase the total boost value ΔVallnetA, α and β may be increased. However, for example, if Cagd is increased in order to increase β, Ctotal is increased accordingly, so that α is reduced. In view of this, it is preferable to set the capacitor values while considering balance therebetween.

Furthermore, in the above example, each of (i) the high level of the voltage Vpulse1 and (ii) the high level of the voltage Vpulse2 is set to be equal to that of the voltage Vpulse1 of the conventional configuration, in order that the power source section and the IC can be configured according to architecture similar to conventional one with the power source voltage unchanged and that an increase in the number of power source voltage levels is prevented for avoiding complexity in the configuration of the power source section. However, either of or both of (i) the high level of the voltage Vpulse1 and (ii) the high level of the voltage Vpulse2 may be further increased so as to increase the total boost value ΔVallnetA. In this case, it is preferable to consider balance between (i) the high level of the voltage Vpulse1 and the high level of the voltage Vpulse2 and (ii) each capacitor value.

In particular, applicable capacitors and voltages vary depending on the product specification of the display device. Therefore, it is preferable to design the power source section according to this, in order to maximize the total boost value ΔVallnetA.

As described above, the present embodiment increases the output of the source follower of the amplifier TFT 52, i.e., enlarges the dynamic range of the output of the photosensor, thereby making it possible to detect a greater light-dark difference with respect to light emitted to the photosensor 54, as compared with that of the conventional configuration. Furthermore, according to the present embodiment, it is possible to enlarge the dynamic range without (i) increasing a power source voltage for the photosensor 54 or (ii) increasing a size of an element in order to increase the electric potential at the gate.

Thus, the present embodiment can provide a display device including a display region provided with a photosensor, which display device is capable of enlarging a dynamic range of a sensor output, without (a) increasing a power source voltage for the photosensor or (b) reducing an aperture ratio of a pixel.

This effect is, in other words, to increase a current outputted by the amplifier TFT 52. Since the output voltage Vout is increased, it is also possible to reduce the output period T2. Further, since the output voltage Vout is increased, it is also possible to reduce the capacitor value Cst of the capacitor 53 and accordingly to reduce an area occupied by the capacitor 53, so as to increase an aperture ratio of a pixel. Furthermore, since the current outputted by the amplifier TFT 52 is increased, it is also possible to reduce a channel width of the amplifier TFT 52 and accordingly to reduce an area occupied by the amplifier TFT 52, so as to increase an aperture ratio of a pixel. Moreover, thanks to the above effect, it is also possible to reduce the respective peak-to-peak voltages of the voltages Vpulse1 and Vpulse2 in the two-step boosting, so as to make it possible to use an IC having a low durability and reduce cost.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is suitably applicable to display devices employing fingerprint authentication and/or a touch panel, each of which uses a photosensor.

REFERENCE SIGNS LIST

1 Liquid crystal display device (display device)
4 Source driver (light intensity detecting means)
11 TFT (transistor)
52 TFT
53 Capacitor
54 Photosensor
Vout Output voltage (output of source follower)
Vpulse1 Voltage (second pulse signal)
Vpulse2 Voltage (first pulse signal)

The invention claimed is:

1. A display device of matrix type, comprising:
photosensors, provided in a display region, each for outputting a signal corresponding to an intensity of light emitted to the photosensor;
thin-film transistors of n-channel type, the thin-film transistors each serving as a source follower including a gate to which the signal is inputted;
light intensity detecting means for detecting the intensity of the light by detecting an output of the source follower, which is the thin-film transistor; and
a capacitor having a first end connected with the gate and a second end which is opposite to the first end, wherein
each thin-film transistor includes a drain to which a first pulse signal having a first pulse is inputted, the first pulse rising from a low level to a high level in a state where the signal is inputted to the gate of the thin-film transistor, and
the second end of the capacitor which is opposite to the first end is configured to receive a second pulse signal having a second pulse as an input, the second pulse rising from a low level to a high level before a timing at which the first pulse rises, and the second pulse falling from the high level to the low level after the timing at which the first pulse rises.

2. The display device as set forth in claim 1, wherein:
the second pulse falls from the high level to the low level after a timing at which the first pulse falls.

3. The display device as set forth in claim 1, wherein:
(i) an electric potential of the high level of the first pulse and (ii) an electric potential of the high level of the second pulse are equal to each other.

4. The display device as set forth in claim 1, wherein:
at an earlier one of (i) a timing at which the first pulse ends and (ii) a timing at which the second pulse ends, the output of the source follower has an electric potential lower than an electric potential obtained by subtracting (i) a threshold voltage of the thin-film transistor from (ii) an electric potential at the gate of the thin-film transistor.

5. The display device as set forth in claim 1, wherein:
the photosensor and the thin-film transistor are provided in each pixel row.

6. The display device as set forth in claim 1, wherein:
the display region is made of amorphous silicon.

7. The display device as set forth in claim 1, wherein:
the first pulse signal is generated by a circuit provided in the display region in a form of a chip on glass.

8. The display device as set forth in claim 1, wherein:
the photosensor is a diode-connected transistor, and the photosensor includes a cathode connected with the gate of the thin-film transistor.

9. The display device as set forth in claim 1, wherein:
the display region includes liquid crystal as a display element.

10. A method for driving a display device of matrix type, the display device including:

photosensors, provided in a display region, each for outputting a signal corresponding to an intensity of light emitted to the photosensor;

thin-film transistors of n-channel type, the thin-film transistors each serving as a source follower including a gate to which the signal is inputted; and light intensity detecting means for detecting the intensity of the light by detecting an output of the source follower, which is the thin-film transistor, said method comprising:

inputting a first pulse signal having a first pulse to a drain of each thin-film transistor, the first pulse rising from a low level to a high level in a state where the signal is inputted to the gate of the thin-film transistor, and inputting, via a capacitor, a second pulse signal having a second pulse to the gate, the second pulse rising from a low level to a high level before a timing at which the first pulse rises, and the second pulse falling from the high level to the low level after the timing at which the first pulse rises.

11. The method as set forth in claim 10, wherein:
the second pulse falls from the high level to the low level after a timing at which the first pulse falls.

12. The method as set forth in claim 10, wherein:
(i) an electric potential of the high level of the first pulse and (ii) an electric potential of the high level of the second pulse are equal to each other.

13. The method as set forth in claim 10, further comprising:
setting a period of the first pulse so that, at an earlier one of (i) a timing at which the first pulse ends and (ii) a timing at which the second pulse ends, the output of the source follower has an electric potential lower than an electric potential obtained by subtracting (i) a threshold voltage of the thin-film transistor from (ii) an electric potential at the gate of the thin-film transistor.

* * * * *